(12) United States Patent
Macaraeg et al.

(10) Patent No.: US 12,247,554 B2
(45) Date of Patent: *Mar. 11, 2025

(54) ENVIRONMENTAL ASPECT CONTROL ASSEMBLY

(71) Applicant: THE BOEING COMPANY, Arlington, VA (US)

(72) Inventors: Sesinando P. Macaraeg, Everett, WA (US); Frederick T. Calkins, Renton, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,791

(22) Filed: Oct. 10, 2023

(65) Prior Publication Data

US 2024/0035453 A1 Feb. 1, 2024

Related U.S. Application Data

(63) Continuation of application No. 14/590,337, filed on Jan. 6, 2015, now Pat. No. 11,821,409.

(51) Int. Cl.
*F03G 7/06* (2006.01)
*B64C 1/06* (2006.01)
*B64C 1/40* (2006.01)
*B64D 13/06* (2006.01)

(52) U.S. Cl.
CPC ............... *F03G 7/06* (2013.01); *B64C 1/067* (2013.01); *B64C 1/40* (2013.01); *B64D 2013/0662* (2013.01)

(58) Field of Classification Search
CPC ..... B64C 1/067; B64C 1/40; F03G 7/06; F03G 7/065
See application file for complete search history.

(56) References Cited

U.S. PATENT DOCUMENTS

| | | | | |
|---|---|---|---|---|
| 5,700,337 | A * | 12/1997 | Jacobs | B29C 70/865 156/298 |
| 11,821,409 | B2 * | 11/2023 | Macaraeg | F03G 7/06 |
| 2005/0016637 | A1 * | 1/2005 | Yambe | A61F 2/04 148/402 |
| 2010/0138983 | A1 * | 6/2010 | Kim | B32B 27/322 427/404 |
| 2014/0220277 | A1 * | 8/2014 | Lewis | F16L 59/021 428/319.3 |

* cited by examiner

*Primary Examiner* — Larissa Rowe Emrich
(74) *Attorney, Agent, or Firm* — Joseph M. Butscher; The Small Patent Law Group LLC

(57) ABSTRACT

An environmental aspect control assembly is configured to control one more environmental aspects. The environmental aspect control assembly may include at least one aspect-controlling portion formed of one or more environmental aspect-controlling materials, and at least one shape-changing actuator operatively connected to the aspect-controlling structure(s). The shape-changing actuator(s) is configured to have a first actuator shape at a first temperature and a second actuator shape at a second temperature that differs from the first temperature. The first actuator shape causes the aspect-controlling structure(s) to form a first structural shape. The second actuator shape causes the aspect-controlling structure(s) to form a second structural shape that differs from the first structural shape.

20 Claims, 6 Drawing Sheets

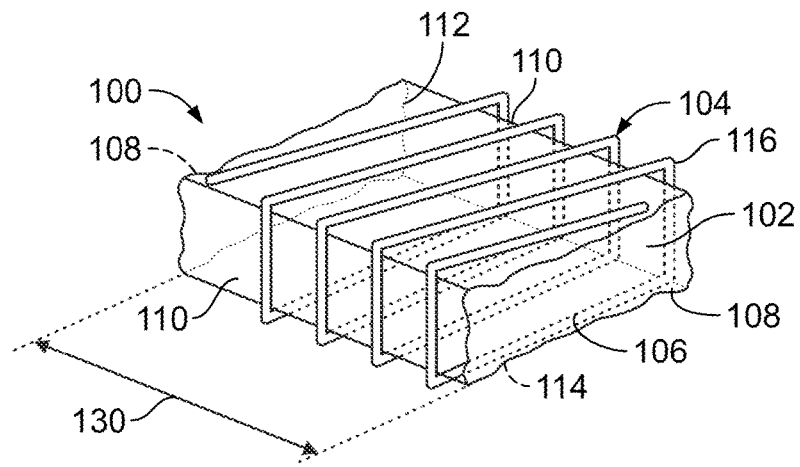
FIG. 1
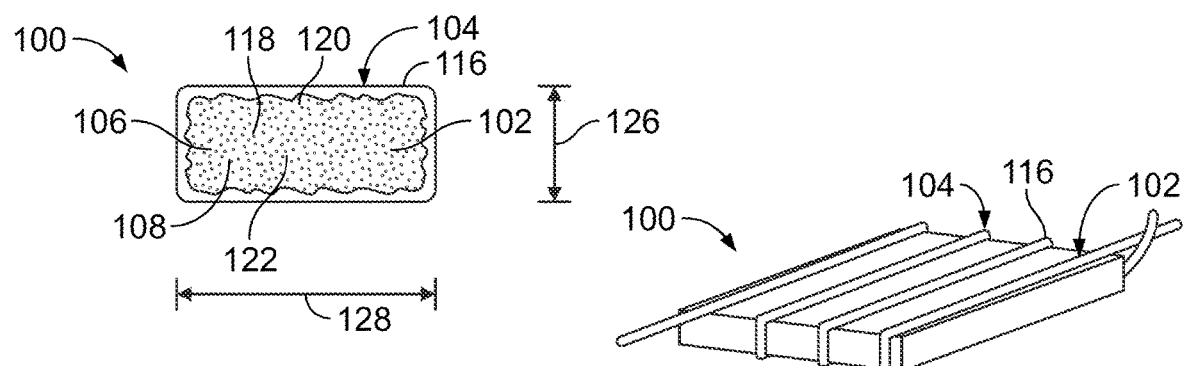
FIG. 2
FIG. 3
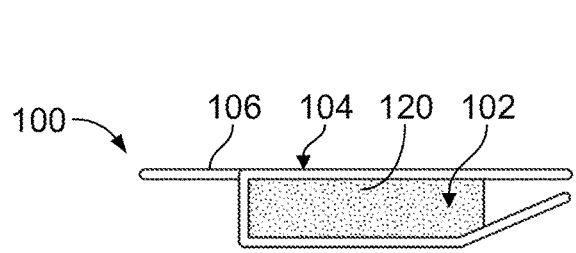
FIG. 4
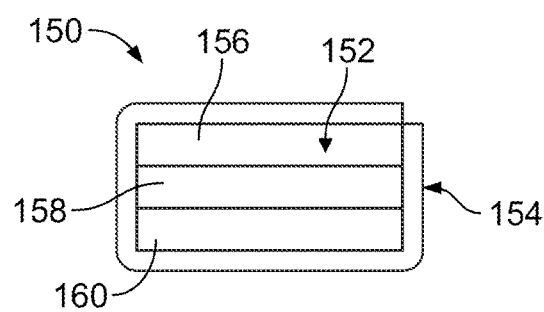
FIG. 5

ENVIRONMENTAL ASPECT CONTROL ASSEMBLY

RELATED APPLICATIONS

This application is a continuation of U.S. patent application Ser. No. 14/590,337, entitled Environmental Aspect Control Assembly," filed Jan. 6, 2015, now U.S. Pat. No. 11,821,409, which is hereby incorporated by reference in its entirety.

BACKGROUND OF THE DISCLOSURE

Embodiments of the present disclosure generally relate to an environmental aspect control assembly.

As an airplane is operated, condensation typically occurs during various phases of flight. During aircraft design and manufacture, special consideration is given with respect to the potential of moisture within the airplane, so as to ensure that corrosion of various internal structures, short-circuiting, arcing, and/or degradation of electrical components, and the like, does not occur. In general, condensation is directly related to environmental conditions within an interior cabin of the airplane, and indirectly related to ambient conditions outside of the airplane when grounded. Passengers, crew, onboard meals, and onboard beverages may contribute to condensation within an airplane.

Water accumulation due to condensation occurs in both short and long range flights, but is generally more severe and excessive in continuous long-range flights over six hours having quick turn-around departures. Accordingly, various systems and methods have been developed to control and manage condensation within an airplane.

Many airplanes include various moisture management devices to minimize or otherwise reduce moisture within an interior cabin. For example, drainage paths within various structures, moisture impermeable insulation blankets, zonal air dryers (such as dehumidifiers), humidity control systems, and moisture management devices are used to capture and/or direct moisture away from an internal cabin interior and divert the moisture to a bilge, through which the moisture drains overboard via pressure valves.

As can be appreciated, however, the various moisture management devices add weight and cost to an airplane. Further, installing the various moisture management devices increases manufacturing time.

Additionally, various moisture management devices may not be able to absorb excessive amounts of moisture. For example, as an absorptive material exceeds an absorption limit, excess moisture may leak therefrom, and drip or flow into the interior of a cabin. Once saturated, a moisture-management device may not return to its original effectiveness for a prolonged period of time.

Also, during manufacture of a moisture management device, such as an absorbing sheet of material, the moisture management device may be compressively rolled or stacked in relation to other moisture management devices. As the moisture management device is compressed, internal absorbing space within the moisture management device is also compressed, which may reduce the ability of the moisture management device to absorb and retain moisture. Further, as the moisture management device is compressed, its effectiveness may decrease.

Accordingly, a need exists for a more efficient moisture management device.

SUMMARY OF THE DISCLOSURE

Embodiments of the present disclosure provide environmental aspect control assemblies that are configured to transition between expanded and compressed states in response to changing environmental conditions, such as changes in temperature and/or pressure.

Certain embodiments of the present disclosure provide an environmental aspect control assembly configured to control one or more environmental aspects, such as moisture, sound, and/or temperature. The environmental aspect control assembly may include at least one aspect-controlling portion (such as a structure) formed of one or more environmental aspect-controlling materials, and at least one shape-changing actuator operatively connected to the aspect-controlling structure(s). The shape-changing actuator(s) is configured to have a first actuator shape at a first temperature and a second actuator shape at a second temperature that differs from the first temperature. The first actuator shape causes the aspect-controlling structure(s) to form a first structural shape. For example, the first actuator shape may compress the aspect-controlling structure(s) into the first structural shape. Optionally, the first actuator shape may expand the aspect-controlling structure(s) into an expanded (for example, increased fluffiness, which may relate to increased thickness and/or volume, and/or decreased density) shape. The second actuator shape causes the aspect-controlling structure(s) to form a second structural shape that differs from the first structural shape. For example, the second actuator shape may expand the aspect-controlling structure(s) into the second structural shape. Optionally, the second actuator shape may compress the aspect-controlling structure(s) into a compressed shape, which may be characterized by decreased thickness, decreased volume, and/or increased density. As such, the first structural shape may be one of an expanded or compressed structural shape, while the second structural shape may be the other of the expanded or compressed structural shape.

In at least one embodiment, the environmental aspect-controlling material includes aramid felt that is configured to absorb moisture. In at least one embodiment, the environmental aspect-controlling material includes open-cell foam that is configured to absorb sound. In at least one embodiment, the environment aspect-controlling material includes fiberglass insulation that is configured to trap air, for example, in order to manage temperature.

The shape-changing actuator(s) may include one or more of a wire, frame, filament, beam, cage, panel, strip, mesh, sheet, coil, and/or the like that is formed of a shape memory alloy. The shape memory alloy may be a two-way shape memory alloy. Alternatively, the shape memory alloy may be a one-way shape memory alloy. Optionally, the shape-changing actuator(s) may be formed of one or more shape memory polymers, bimetallic and/or other multiple-component materials.

In at least one embodiment, the aspect-controlling structure(s) may include a first layer configured to control moisture, a second layer configured to control sound, and a third layer configured to control temperature. Alternatively, the aspect-controlling structure may include one or more layers in which each layer is configured to control moisture, sound, and/or temperature.

The shape-changing actuator(s) may be secured around at least a portion of the aspect-controlling structure(s). In at least one other embodiment, the shape-changing actuator(s) may be embedded within the aspect-controlling structure(s). In still another embodiment, the shape-changing actuator(s) may include a plurality of shape-changing filaments, and the aspect-controlling structure(s) may include a plurality of aspect-controlling fibers. Each of the shape-changing filaments is connected to at least one of the aspect-controlling fibers.

Certain embodiments of the present disclosure provide a system that may include a main system structure that includes one or more environmental aspect control assemblies. Each of the environmental aspect control assemblies may include at least one aspect-controlling structure formed of an environmental aspect-controlling material, and at least one shape-changing actuator operatively connected to the aspect-controlling structure(s). The shape-changing actuator(s) is configured to have a first actuator shape at a first temperature and a second actuator shape at a second temperature that differs from the first temperature. The first actuator shape causes the aspect-controlling structure(s) to form a first structural shape, and the second actuator shape causes the aspect-controlling structure(s) to form a second structural shape that differs from the first structural shape. Each environmental aspect control assembly may automatically adapt to an environment based on changes in temperature and/or pressure.

In at least one embodiment, the system includes a vehicle (such as a land, sea, air, or space based vehicle) in which the main system structure includes a frame, fuselage, or the like having an internal cabin. In at least one other embodiment, the system includes an article of clothing having an insulating layer between inner and outer layers. The environmental aspect control assembly or assemblies are disposed within and/or on the insulating layer.

BRIEF DESCRIPTION OF THE DRAWINGS

FIG. 1 illustrates a perspective view of an environmental aspect control assembly in an expanded state, according to an embodiment of the present disclosure.

FIG. 2 illustrates an end view of an environmental aspect control assembly in an expanded state, according to an embodiment of the present disclosure.

FIG. 3 illustrates a perspective view of an environmental aspect control assembly in a compressed state, according to an embodiment of the present disclosure.

FIG. 4 illustrates an end view of an environmental aspect control assembly in a compressed state, according to an embodiment of the present disclosure.

FIG. 5 illustrates an end view of an environmental aspect control assembly in an expanded state, according to an embodiment of the present disclosure.

DETAILED DESCRIPTION OF THE DISCLOSURE

Figure 6:
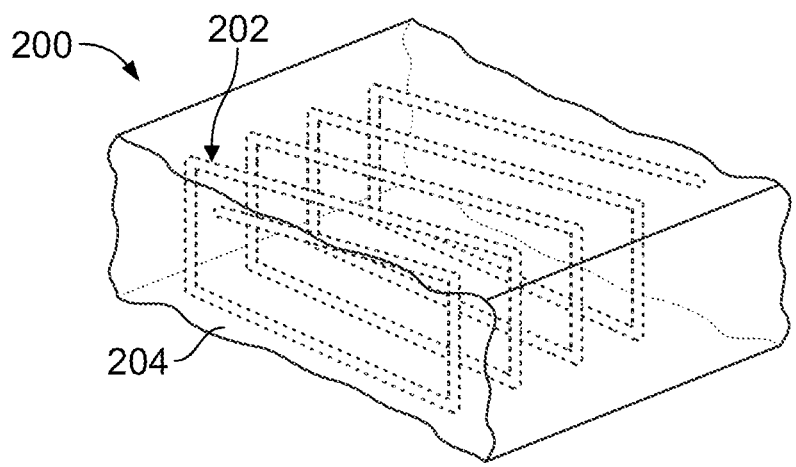
FIG. 6 illustrates a perspective view of an environmental aspect control assembly in an expanded state, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide environmental aspect control assemblies that are configured to control one or more environmental aspects. Examples of environmental aspects include, but are not limited to, moisture control, sound dampening or attenuation, temperature, and the like. Each environmental aspect control assembly may include an aspect-controlling structure that is operatively connected to a shape-changing actuator.

The aspect-controlling structure may include a structure, such as a sheet, panel, strip, beam, mesh, frame, aggregate, or the like formed of an environmental aspect-controlling material. For example, a moisture-controlling environmental aspect control assembly may include a sheet, panel, strip, beam, or the like formed of an aramid felt that is configured to absorb moisture. A sound-attenuating environmental aspect control assembly may include a sheet, panel, strip, beam, mesh, frame, aggregate, or the like formed of a sound-dampening material, such open-cell foam, cork, rubber, or the like. A temperature-controlling environmental aspect control assembly may include a sheet, panel, strip, beam, or the like formed of an insulating material, such as encased goose down, fiberglass insulation, or the like.

The shape-changing actuator may include a structure formed of a shape memory alloy, and/or a shape memory polymer. For example, the shape-changing actuator may include a wire, frame, filament, beam, panel, cage, strip, sheet, or the like that is operatively connected to the aspect-controlling structure. The shape-changing actuator is configured to change shapes in response to a change in temperature and/or pressure. As the shape-changing actuator changes shape, the aspect-controlling structure changes shape in response thereto. For example, at a first temperature (such as a compression transition temperature), the shape-changing actuator may have a first shape that constricts around the aspect-controlling structure and thereby compresses or squeezes the aspect-controlling structure. At a second temperature (such as an expansion transition temperature), the shape-changing actuator may have a second shape that expands the aspect-controlling structure. For example, the shape-changing actuator may outwardly pull and/or push the aspect-controlling structure, thereby increasing the fluffiness of the aspect-controlling structure. The shape of the shape-changing actuator may gradually transition from the first temperature to the second temperature, thereby gradually expanding the aspect-controlling structure. Alternatively, the shape of the shape-changing actuator may instantaneously transition at specific transition temperatures. The first temperature may exceed the second temperature. Alternatively, the second temperature may exceed the first temperature.

A shape memory alloy is an alloy that has an original shape. When deformed, the shape memory alloy returns to the original shape upon a change in temperature. For example, after being deformed, the shape memory alloy returns to the original shape as it is subjected to an increasing temperature. Alternatively, the shape memory alloy may return to the original shape as it is subjected to a decreasing temperature.

Examples of shape memory alloys include nickel-titanium, and copper-aluminum-nickel. Other examples of shape memory alloys may be formed from alloys of zinc, copper, gold, and iron. Nickel-titanium, for example, changes from austenite to martensite upon cooling.

The shape memory alloy may be a one-way shape memory alloy, or a two-way shape memory alloy. For example, when a one-way shape memory alloy is in a cold state, the shape memory alloy may be bent or stretched and retain such shape until heated above a transition temperature. Upon heating, the shape changes to the original shape. When the one-way shape memory alloy cools, it remains in the original shape until it is actively deformed again.

In contrast, a two-way shape memory alloy actively transitions between two different shapes. For example, at a low temperature, the two-way shape memory alloy is in a first shape, while at a high temperature, the two-way shape memory is in a second shape that differs from the first shape. The changing shapes are obtained through the change in temperature without an external force (for example, an external physical force, such as a mechanical compression) being exerted into the material.

FIG. 1 illustrates a perspective view of an environmental aspect control assembly 100 in an expanded state, according to an embodiment of the present disclosure. The environmental aspect control assembly 100 includes an aspect-controlling portion, such as an aspect-controlling structure 102, and a shape-changing actuator 104 operatively connected to an outside surface of the aspect-controlling structure 102.

The aspect-controlling structure 102 may be formed of an aramid felt beam that is configured to absorb moisture. While the aspect-controlling structure 102 is shown as a beam, the aspect-controlling structure 102 may be various other shapes, such as a sheet, panel, sphere, or various other shapes and sizes.

The aspect-controlling structure 102 includes a main body 106 having opposed ends 108 connected to opposed sides 110 and opposed upper and lower surfaces 112 and 114. The main body 106 defines an internal structure that may be formed of fibers, such as aramid fibers, and air pockets.

The shape-changing actuator 104 may be formed of a single piece of shape memory alloy wire 116 that may wrap around outer surfaces of the aspect-controlling structure 102. For example, the wire 116 may be formed of a two-way shape memory alloy, such as nickel-titanium. At least portions of the wire 116 may be secured to outer surfaces of the aspect-controlling structure 102 through bonding, fasteners, brackets, and/or the like. As such, movement of the shape-changing actuator 104 causes a corresponding movement in the aspect-controlling structure 102. Alternatively, the wire 116 may be formed of at least one shape memory polymer. Also, alternatively, the shape-changing actuator 104 may be formed of a combination of at least one shape memory alloy and at least one shape memory polymer.

FIG. 2 illustrates an end view of the environmental aspect control assembly 100 in the expanded state, according to an embodiment of the present disclosure. As shown, the main body 106 includes an internal structure 118 that may include a plurality of fibers 120 and air pockets 122. In the expanded state, the aspect-controlling structure 102 may be fully-expanded to a maximum height 126, a maximum width 128, and a maximum length 130 (shown in FIG. 1). Alternatively, in the fully-expanded state, the shape-changing actuator 104 may contain the aspect-controlling structure 102 so that it is not at a maximum height, a maximum width, and a maximum length.

The shape-changing actuator 104 may be defined by an expanded shape, as shown in FIGS. 1 and 2, at a first temperature, such as a cool temperature (for example, below 40° F.). In general, the shape-changing actuator 104 may abut a surface that is proximate to a space that is susceptible to temperature fluctuations. For example, the shape-changing actuator 104 may be secured to an inner surface of an outer wall of a fuselage of an airplane. The environmental aspect control assembly 100 may be on board an aircraft, attached to or within fittings, cabin walls, or the like, where the first temperature is reached at an altitude that is 10,000 feet above sea level, for example. As such, during the flight, the environmental aspect control assembly 100 is at a fully-expanded state during most of the flight. As the aircraft descends below 10,000 feet, the shape-changing actuator 104 is subjected to an increased temperature. As the aircraft reaches a transition temperature, such as 70° F., for example, the environmental aspect control assembly 100 transitions to a compressed state, as the shape-changing actuator 104 squeezes and compresses the aspect-controlling structure 102.

In the expanded state, the shape-changing actuator 104 is in an expanded actuator shape, which causes the aspect-controlling structure 102 to be in an expanded structural shape. For example, as the shape-changing actuator 104 expands to the expanded actuator shape, the aspect-controlling structure 102 expands to the expanded structural shape in response to the expansion of the shape-changing actuator 104.

The shape of the shape-changing actuator 104 as shown in FIGS. 1 and 2 is merely exemplary. It is to be understood that the expanded shape may be various other shapes, sizes, and configurations.

FIG. 3 illustrates a perspective view of the environmental aspect control assembly 100 in a compressed state, according to an embodiment of the present disclosure. In the compressed state, the shape-changing actuator 104 constricts around the aspect-controlling structure 102, thereby squeezing or otherwise compressing the aspect-controlling structure 102. The constricting shape of the shape-changing actuator 104 as shown is merely exemplary. It is to be understood that the constricting shape that compresses the aspect-controlling structure 102 may be various other shapes and sizes. For example, the shape-changing actuator 104 may include collapsible segments that collapse in the compressed state, similar to bellows, for example.

FIG. 4 illustrates an end view of the environmental aspect control assembly 100 in the compressed state, according to an embodiment of the present disclosure. As shown, in the compressed state, the fibers 120 are compressed together, which reduces the size of the air pockets 122. In the compressed state, the shape-changing actuator 104 constricts around and compresses the aspect-controlling structure 102 and reduces one or more of the height, width, and/or length of the aspect-controlling structure 102.

The shape-changing actuator 104 may be defined by a compressed shape, as shown in FIGS. 3 and 4, at the second temperature, such as a warm temperature (for example, above 70° F.). As noted, the environmental aspect control assembly 100 may be on board an aircraft, attached to or within fittings, cabin walls, or the like, where the second temperature is reached at sea level or otherwise below an of feet above sea level, for example. As such, when grounded, the environmental aspect control assembly 100 is in a compressed state. As the aircraft ascends above sea level, the shape-changing actuator 104 is subjected to decreasing temperature. As the aircraft reaches a transition temperature, such as 40° F., for example, the environmental aspect control assembly 100 transitions to the expanded state, as the shape-changing actuator 104 expands and the aspect-controlling structure 102 outwardly expands in response thereto.

In the compressed state, the shape-changing actuator 104 is in a compressed actuator shape, which causes the aspect-controlling structure 102 to be in a compressed structural shape. For example, as the shape-changing actuator 104 compresses to the compressed actuator shape, the aspect-controlling structure 102 compresses to the compressed structural shape in response to the exerted compression of the shape-changing actuator 104.

As noted, the aspect-controlling structure 102 may be formed of a material configured to absorb moisture. For example, the aspect-controlling structure 102 may be formed of aramid felt cloth. In the expanded state, the aspect-controlling structure 102 is able to absorb moisture. As the environmental aspect control assembly 100 is subjected to a first transition temperature, such as a warm temperature, the shape-changing actuator 104 constricts around the aspect-controlling structure 102, which squeezes the moisture out of the aspect-controlling structure 102. The moisture may then be drained through a drainage system, such as within an aircraft. As such, the environmental aspect control assembly 100 automatically sheds stored water in the compressed state. Therefore, an individual does not need to manually wring the aspect control assembly 100 to remove the stored water, as is the case with standard moisture absorbing devices. As such, embodiments of the present disclosure may not rely solely on a natural evaporation process to dry the aspect control assembly 100, thereby saving considerable amounts of time.

Accordingly, as an aircraft is airborne, the environmental aspect control assembly 100 may be in an expanded state and able to absorb moisture within the aircraft. On the ground, however, the environmental aspect control assembly 100 may be in a compressed state in which the moisture within the aspect-controlling structure 102 is squeezed out and drained out of the aircraft. Because the shape-changing actuator 104 may be formed from a two-way shape memory alloy, the environmental aspect control assembly 100 automatically transitions between the compressed and expanded states in response to changes in temperature (for example, changes between an expansion temperature, at which the environmental aspect control assembly 100 is fully expanded, and a compression temperature, at which the environmental aspect control assembly 100 is fully compressed). In this manner, the environmental aspect control assembly 100 automatically adapts to changing environmental conditions.

Alternatively, the aspect-controlling structure 102 may be formed of a material that is configured to attenuate or dampen sound energy. For example, the aspect-controlling structure 102 may be formed of open-cell foam, cork, rubber, a polymer-based fibers (such as Kevlar, fiberglass, ultem, and the like), or the like. As an airplane is airborne, such as at a cruising altitude, the aspect-controlling structure 102 may be fully-expanded, which generally maximizes its sound-absorptive capabilities. On the ground, an aircraft may generate a first level of sound, which may be less than a second level of sound generated by the aircraft when airborne. Therefore, less sound absorption may be needed on the ground as compared to when an aircraft is airborne. Accordingly, a sound-absorbing aspect-controlling structure 102 may be in an expanded state while airborne, and a compressed state while on the ground.

Further, during manufacture, a sound-absorbing aspect-controlling structure 102 may not be easily secured within a confined space, such as within a boundary wall within an interior cabin of an aircraft. Therefore, the aspect-controlling structure 102 may be formed of a one-way shape memory alloy and/or shape memory polymer so that the environmental aspect control assembly 100 may be compressed as it is inserted into position during a manufacturing process, and then expanded (such as through application of heat) to fit securely within a particular area or volume.

Also, alternatively, the aspect-controlling structure 102 may be formed of an insulating material, such as fiberglass. As an airplane is airborne, such as at a cruising altitude in which ambient temperatures are low, the aspect-controlling structure 102 may be fully-expanded, which generally maximizes its heat-insulating properties. At ground level, in which the ambient temperature is warmer, the aspect-controlling structure is compressed, which reduces its heat-insulating properties. In this manner, the environmental aspect control assembly 100 may automatically adapt to increased insulating capabilities as the ambient temperature drops.

Also, during manufacture, an insulating aspect-controlling structure 102 may not be easily secured within a confined space, such as within a boundary wall within an interior cabin of an aircraft. Therefore, the aspect-controlling structure 102 may be formed of a one-way shape memory alloy and/or shape memory polymer so that the environmental aspect control assembly 100 may be compressed as it is inserted into position during a manufacturing process, and then expanded (such as through application of heat) to fit securely within a particular area or volume.

In at least one embodiment, the aspect-controlling structure 102 may be formed of one or more materials that are configured to absorb moisture, dampen or attenuate sound, and provide insulation. For example, the aspect-controlling structure 102 may include a first layer that is configured to absorb moisture, a second layer that is configured to attenuate sound, and a third layer that is configured to provide insulation.

As noted, the shape-changing actuator 104 may be formed of a one way shape memory alloy. During manufacture, a fully-expanded environmental aspect control assembly 100 may be difficult to fit within a confined space. As such, the shape-changing actuator 104 may be inserted into a confined space in a compressed state, such as at a first temperature. In order to expand the aspect control assembly 100 to an expanded state that securely fits within the confined space, the environmental aspect control assembly 100 is subjected to a transition temperature, either a high or low transition temperature, thereby causing the shape-changing actuator 104 to expand, which causes the aspect-controlling structure 102 to expand in response thereto. As such, the environmental aspect control assembly 100 may securely lodge in position due to the change in temperature. Because the shape-changing actuator 104 is formed of a one way shape memory alloy, the environmental aspect control assembly 100 does not compress in response to a subsequent change in temperature.

FIG. 5 illustrates an end view of an environmental aspect control assembly 150 in an expanded state, according to an embodiment of the present disclosure. The environmental aspect control assembly 150 is similar to the environmental aspect control assembly 100 (shown in FIGS. 1-4) and includes an aspect-controlling structure 152 and a shape-changing actuator 154 operatively connected to the aspect-controlling structure 152. The aspect-controlling structure 152 may include a moisture absorbing layer 156 (such as formed of aramid felt cloth) stacked on a sound-absorbing layer 158 (such as formed of open-cell foam), which is, in turn stacked on an insulating layer 160 (such as formed of fiberglass). Alternatively, the layers 156, 158, and 160 may be stacked in different configurations than shown.

FIG. 6 illustrates a perspective view of an environmental aspect control assembly 200 in an expanded state, according to an embodiment of the present disclosure. The environmental aspect control assembly 200 is similar to those described above, except that a shape-changing actuator 202 is positioned within an aspect-controlling structure 204. The shape-changing actuator 202 may be embedded within the aspect-controlling structure 204. For example, the aspect-controlling structure 204 may be molded or bonded around the shape-changing actuator 202. Accordingly, as the shape-changing actuator 202 changes shapes in response to temperature changes, as described above, the aspect-controlling structure 204 changes shape in response to the changing shape of the shape-changing actuator 202.

Figure 7:
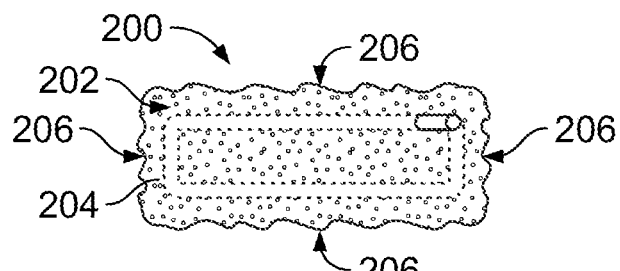
FIG. 7 illustrates an end view of an environmental aspect control assembly in a compressed state, according to an embodiment of the present disclosure.

FIG. 7 illustrates an end view of the environmental aspect control assembly 200 in a compressed state, according to an embodiment of the present disclosure. As the shape-changing actuator 202 inwardly compresses or collapses (in one or more directions, such as compression from one or more of top, bottom, and/or lateral directions) in response to a compression transition temperature, the aspect-controlling structure 204 is drawn inwardly in the directions of arrows 206. As the shape-changing actuator 202 outwardly expands in response to an expansion transition temperature, the shape-changing actuator 202 pushes the aspect-controlling structure 204.

Figure 8:
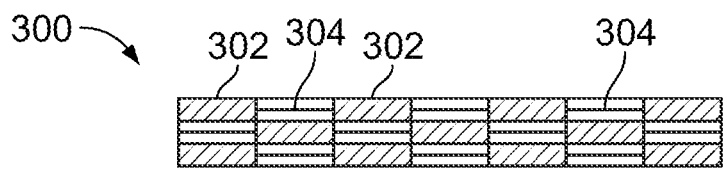
FIG. 8 illustrates a simplified cross-sectional view of an environmental aspect control assembly in an expanded state, according to an embodiment of the present disclosure.

FIG. 8 illustrates a simplified cross-sectional view of an environmental aspect control assembly 300 in an expanded state, according to an embodiment of the present disclosure. The environmental aspect control assembly 300 is similar to those described above, except that, instead of a shape-changing actuator being secured around an aspect-controlling structure (or an aspect-controlling structure being formed around a shape-changing actuator), the environmental aspect control assembly 300 may include a plurality of aspect-controlling structures 302 in the form of material fibers (for example, aramid fibers, fiberglass segments, Gore-Tex, wool, denim, or the like) connected together through individual shape-changing actuators 304. Each shape-changing actuator 304 may be in the shape of a filament that is interwoven with the fibers of the aspect controlling structures 302. As such, the environmental aspect control assembly 300 may be a composite material that includes individual aspect-controlling structures 302 integrally formed with individual shape-changing actuators 304.

In the expanded state, each shape-changing actuator 304 may be a planar member, such as a wire, beam, strip, or the like. When a compression transition temperature is reached, the shape-changing actuators 304 compress and draw the aspect-controlling structures 302 together, which reduces the spaces therebetween and may compress each aspect-controlling structure 302.

Figure 9:
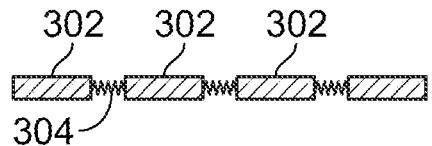
FIG. 9 illustrates a simplified cross-sectional view of aspect-controlling structures connected to compressed shape-changing actuators, according to an embodiment of the present disclosure.

FIG. 9 illustrates a simplified cross-sectional view of the aspect-controlling structures 302 connected to compressed shape-changing actuators 304, according to an embodiment of the present disclosure. As shown, as a compression transition temperature is reached, each shape-changing actuator 304 inwardly collapses, such as into an accordion or bellows shape, which draws adjacent aspect-controlling structures 302 that connect to each shape-changing actuator 304 toward one another.

Figure 10:
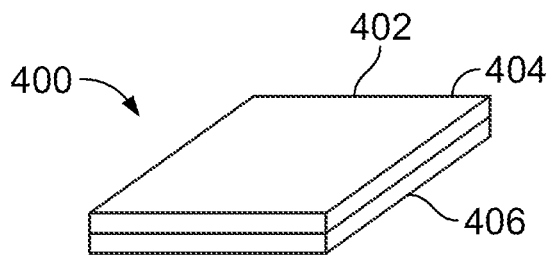
FIG. 10 illustrates a perspective view of an environmental aspect control assembly in an expanded state, according to an embodiment of the present disclosure.

FIG. 10 illustrates a perspective view of an environmental aspect control assembly 400 in an expanded state, according to an embodiment of the present disclosure. The environmental aspect control assembly 400 is similar to those described above, except that a shape-changing actuator 402 is in the form of a sheet 404 that overlays an aspect-controlling structure 406. In the expanded state, the sheet 404 may be flat. As such, the aspect-controlling structure 406 may be flat and fully-extended.

Figure 11:
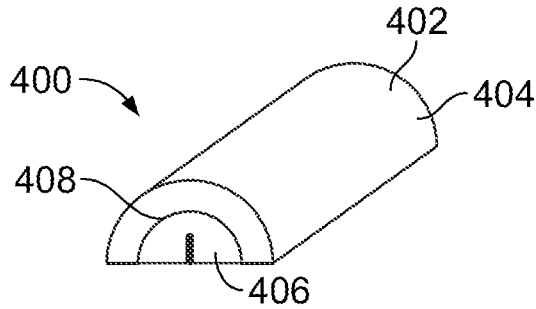
FIG. 11 illustrates a perspective view of an environmental aspect control assembly in a compressed state, according to an embodiment of the present disclosure.

FIG. 11 illustrates a perspective view of the environmental aspect control assembly 400 in a compressed state, according to an embodiment of the present disclosure. As the environmental aspect control assembly 400 is subjected to a compression transition temperature, the sheet 404 curls inwardly in the shape of a C, and curls and compresses the aspect-controlling structure 406 between an inner surface 408 of the formed C.

Referring to FIGS. 1-11, the shape-changing actuators and the aspect-controlling structures may be various shapes and sizes, including those not shown. For example, a plurality of shape-changing actuators in the form of individual strips may be positioned on or in an aspect-controlling structure. The individual strips may or may not be connected to one another. Additionally, a shape-changing actuator may be in the form of a curved or spiraled coil that wraps around an aspect-controlling structure in the form of a cylinder.

Embodiments of the present disclosure provide environmental aspect control assemblies that may be used with a variety of systems, devices, apparatus, goods, articles of manufacture, and the like. For example, one or more environmental aspect control assemblies may be secured within various portions of an aircraft, automobile, train, or other such vehicle. Additionally, one or more environmental aspect control assemblies may be secured within a lining of a coat, blanket, sleeping bag, or the like.

Figure 12:
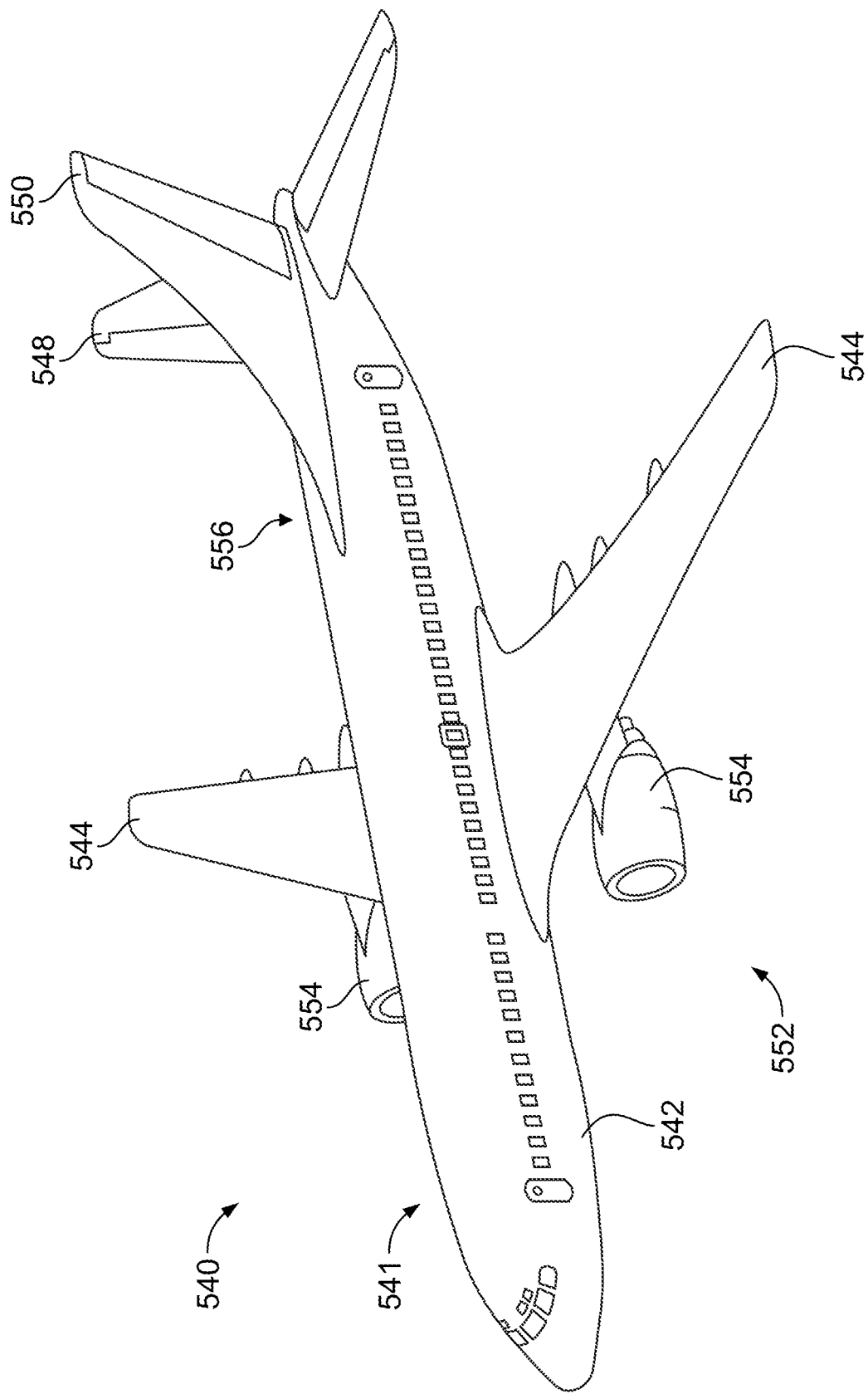
FIG. 12 illustrates a perspective top view of an aircraft, according to an embodiment of the present disclosure.

FIG. 12 illustrates a perspective top view of an aircraft 540, according to an embodiment of the present disclosure.

The aircraft 540 is an example of a system having a main system structure 541 that may include one or more environmental aspect control assemblies, as described above. The aircraft 540 may include a propulsion system 552 that may include two turbofan engines 554. The engines 554 are carried by the wings 544 of the aircraft 540. In other embodiments, the engines 554 may be carried by a fuselage 542 and/or the empennage 556. The empennage 556 may also support horizontal stabilizers 548 and a vertical stabilizer 550.

Figure 13:
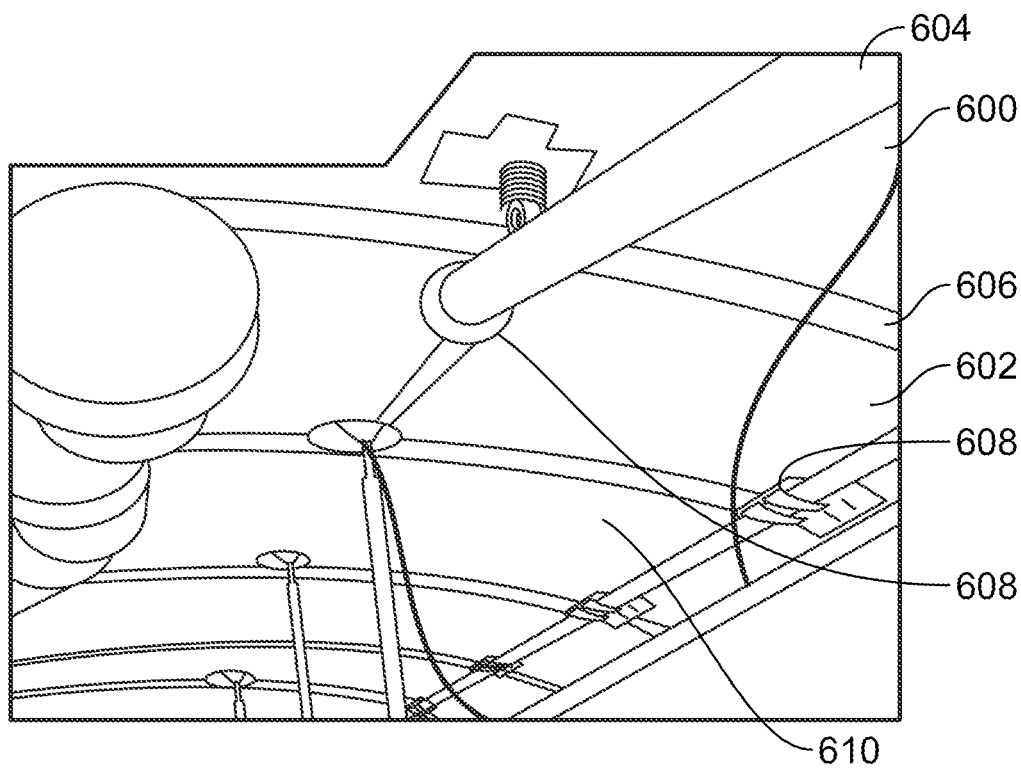
FIG. 13 illustrates a perspective internal view of a portion of a fuselage of an aircraft, according to an embodiment of the present disclosure.

FIG. 13 illustrates a perspective internal view of a portion of a fuselage 600 of an aircraft, according to an embodiment of the present disclosure. The fuselage 600 defines an internal chamber 602 that may include structural supports, such as beams 604 and cross beams 606 that support panels. Environmental aspect control assemblies 608 may be secured around joints on or between beams 604 and 606. Further, environmental aspect control assemblies 610 in the form of insulating panels may be positioned underneath structural panels (hidden from view). The environmental aspect control assemblies 608 may be used to control various environmental aspects, such as moisture, sound, temperature, and/or the like. The environmental aspect control assemblies 608 may transition from or between first and second states in response to changes in temperature, as described above.

Figure 14:
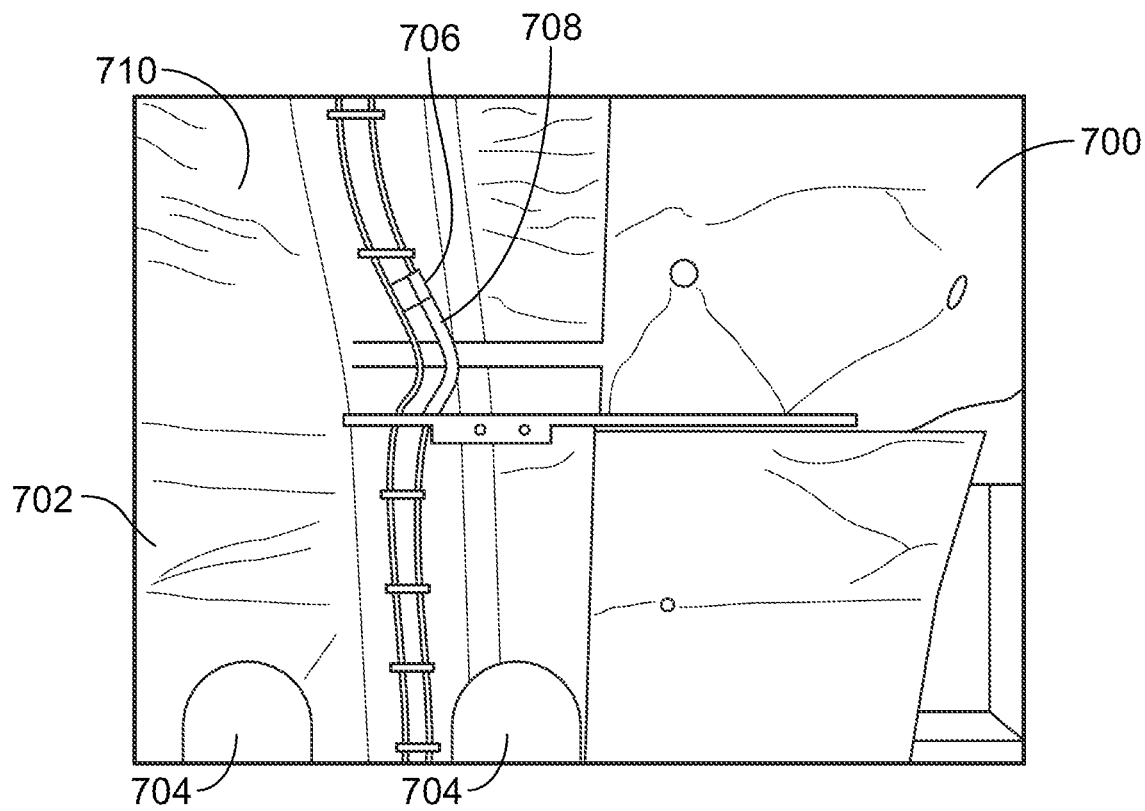
FIG. 14 illustrates a perspective internal view of a passenger cabin of an aircraft, according to an embodiment of the present disclosure.

FIG. 14 illustrates a perspective internal view of a passenger cabin 700 of an aircraft, according to an embodiment of the present disclosure. The passenger cabin 700 includes an outer wall 702 that defines one or more windows 704. For the sake of clarity, an inner covering wall is not shown in FIG. 14. An environmental aspect control assembly 706, in the form of a material strip, may be wrapped around a portion of an electrical cable 708. Further, one or more environmental aspect control assemblies 710 in the form of insulation panels may be secured between the outer wall 702 and the inner covering wall.

Figure 15:
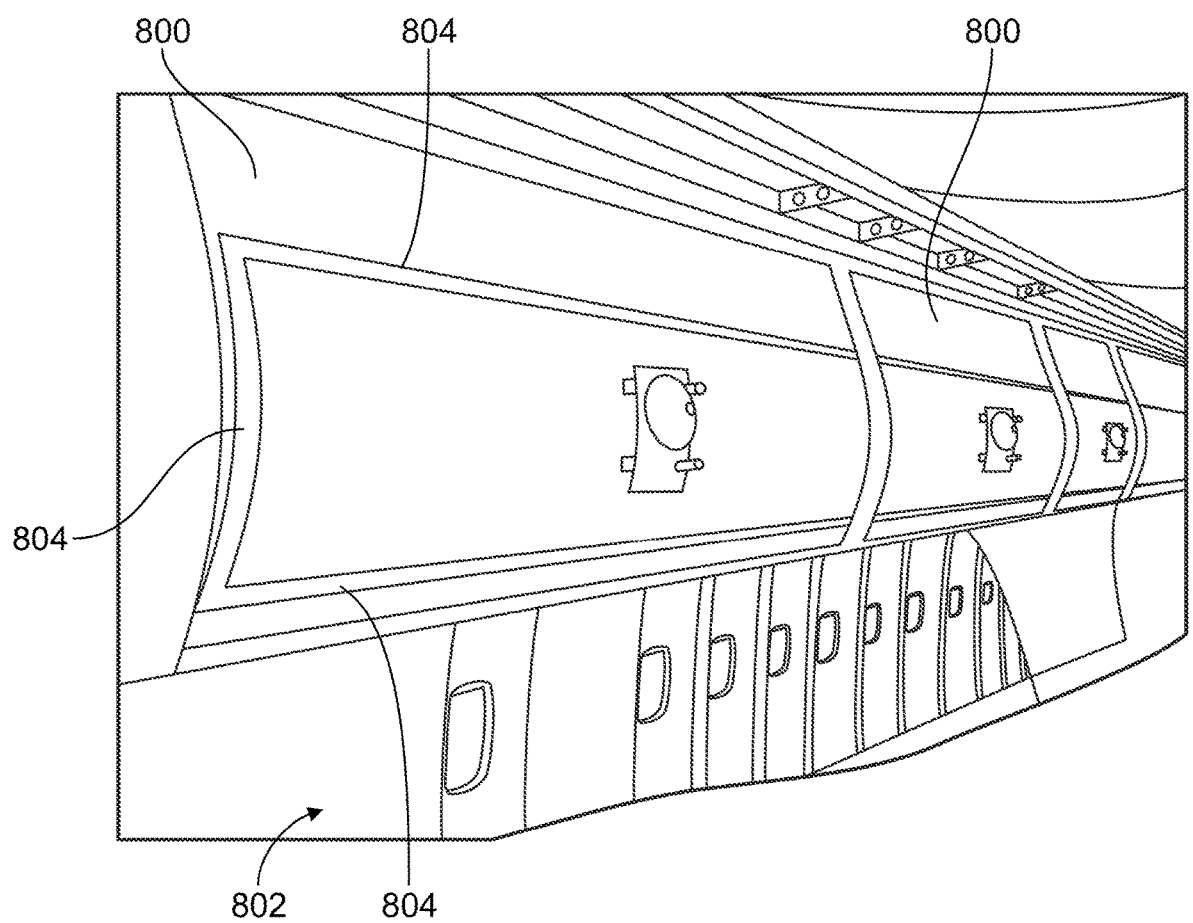
FIG. 15 illustrates a perspective view of ceiling panels within a passenger cabin of an aircraft, according to an embodiment of the present disclosure.

FIG. 15 illustrates a perspective view of ceiling panels 800 within a passenger cabin 802 of an aircraft, according to an embodiment of the present disclosure. A plurality of environmental aspect control assemblies 804, in the form of linear strips, may be secured around or otherwise to portions of the ceiling panels 800.

Figure 16:
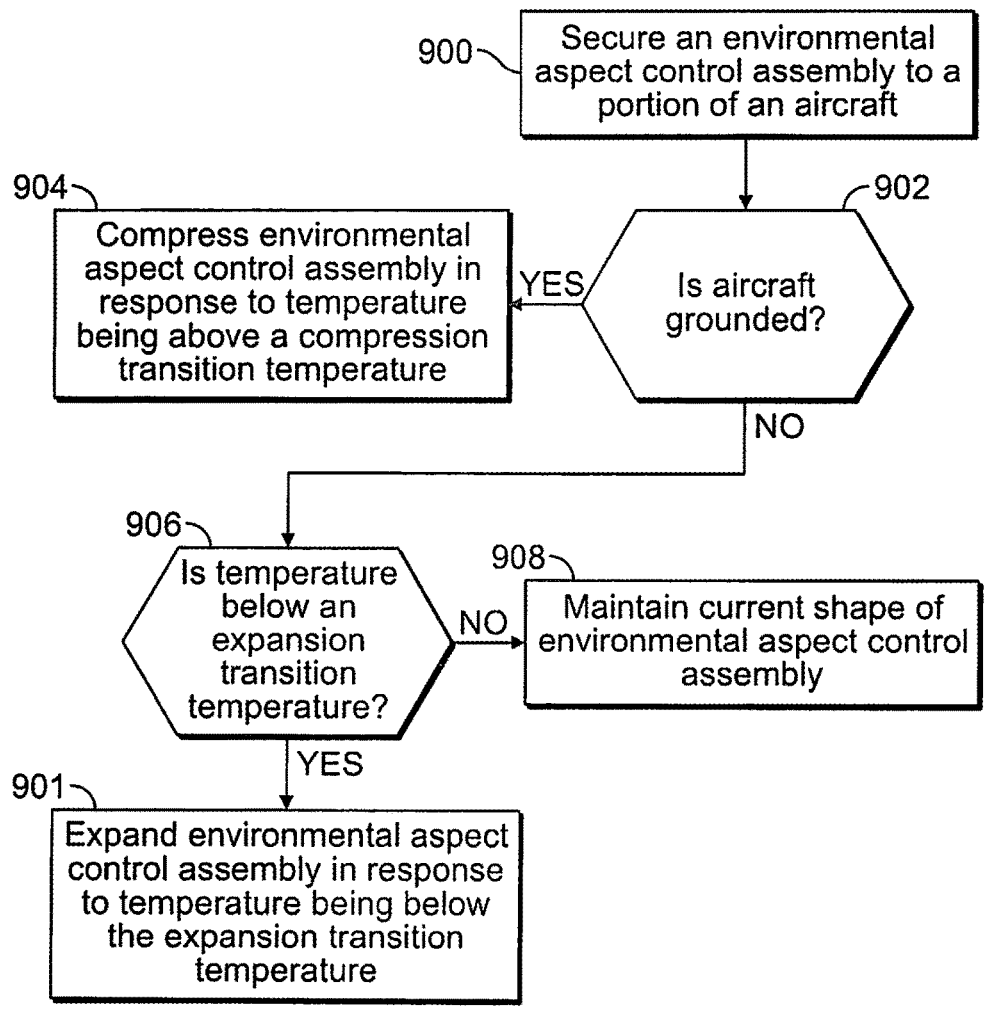
FIG. 16 illustrates a flow chart of a method of operating an environmental aspect control assembly within an aircraft, according to an embodiment of the present disclosure.

FIG. 16 illustrates a flow chart of a method of operating an environmental aspect control assembly within an aircraft, according to an embodiment of the present disclosure. At 900, an environmental aspect control assembly is secured to a portion of an aircraft. Any of the environmental aspect control assemblies may be secured to various portions of the aircraft, such as any of those locations described above.

At 902, it is determined whether the aircraft is grounded, such as when parked at a gate. If so, the method proceeds to 904, in which the environmental aspect control assembly is compressed in response to a temperature being above a compression transition temperature. If, for example, the environmental aspect control assembly is configured to absorb moisture, during the compression, water may be shed from the environmental aspect control assembly and channeled to a drainage system within the aircraft. Alternatively, at 904, the environmental aspect control assembly may be expanded in response to a temperature being above (or alternatively below) an expansion transition temperature.

If, however, the aircraft is not grounded, the method proceeds to 906, in which it is determined if the temperature is below an expansion transition temperature. If not, the method proceeds to 908, in which the current shape of the environmental aspect control assembly is maintained. Optionally, the shape of the environmental aspect control assembly may gradually expand as the temperature decreases toward the expansion transition temperature.

If the temperature is below the expansion transition temperature, the method proceeds to 910, in which the environmental aspect control assembly expands in response to the temperature being below the expansion transition temperature. Alternatively, the environmental aspect control assembly may be configured to compress in response to the temperature being below (or alternatively above) a compression transition temperature.

Figures 17, 18, 19:
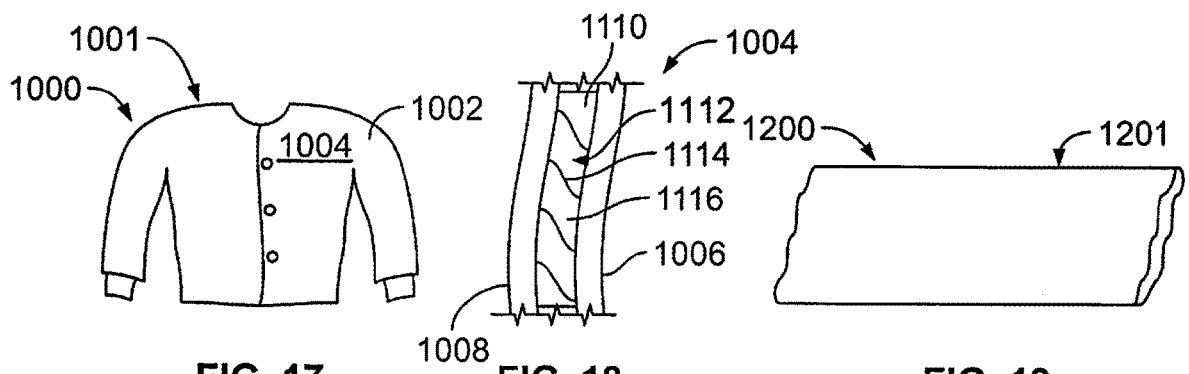
FIG. 17 illustrates a front view of clothing, according to an embodiment of the present disclosure.
FIG. 18 illustrates a cross-sectional view of clothing material, according to an embodiment of the present disclosure.
FIG. 19 illustrates a top view of a blanket, according to an embodiment of the present disclosure.

FIG. 17 illustrates a front view of clothing 1000, according to an embodiment of the present disclosure. The clothing 1000 is an example of a system having a main system structure 1001 that may include one or more environmental aspect control assemblies, as described above. The clothing may be a shirt or outwear, such as a jacket or coat 1002 formed of material 1004. Alternatively, the clothing may be gloves, a hat, a scarf, or the like.

FIG. 18 illustrates a cross-sectional view of the clothing material 1004, according to an embodiment of the present disclosure. The clothing material 1004 may include an inner layer 1006 and an outer layer 1008. An insulating layer 1110 is sandwiched between the inner and outer layers 1006 and 1008, respectively. The insulating layer 1110 may include one or more environmental aspect control assemblies 1112, such as any of those described above. For example, the environmental aspect control assembly 1112 may include a shape-changing actuator 1114 operatively connected to an aspect-controlling structure 1116, such as an encased layer of goose down. As the temperature decreases, the shape-changing actuator 1114 expands, which causes the aspect-controlling structure 1116 to expand in response thereto. In contrast, as the temperature increases, the shape-changing actuator 1114 compresses, thereby causing the aspect-controlling structure 1116 to compress in response thereto. Accordingly, the environmental aspect control assembly 1112 automatically adapts to changes in temperature. In response to cooler temperatures, the environmental aspect control assembly 1112 expands to provide increased insulation. In response to warmer temperatures, the environmental aspect control assembly 1112 compresses to provide decreased insulation.

A material may compress in that it may decrease in linear distance between two or more given points within and/or on the material. Conversely, a material may expand in that it may increase in linear distance between two more given points within and/or on the material.

FIG. 19 illustrates a top view of a blanket or sleeping bag 1200, according to an embodiment of the present disclosure. The blanket 1200 is an example of a system having a main system structure 1201 that may include one or more environmental aspect control assemblies, as described above. The blanket 1200 may include inner and outer layers that sandwich an insulating layer, as described above with respect to FIG. 18. One or more environmental aspect control assemblies may be secured within the insulating layer.

As described above, embodiments of the present disclosure provide efficient environmental aspect control assemblies. The environmental aspect control assemblies may be configured to control one or more environmental aspects, such as moisture (for example, moisture absorption), sound (for example, sound attenuation or dampening), and temperature (for example, variable insulation).

Embodiments of the present disclosure provide an environmental aspect control assembly that may be used in or on an aircraft. The environmental aspect control assembly may be configured to passively aid or promote evaporation by expelling moisture of liquids from absorbent materials (such as an aramid felt cloth) in a compressed state. A temperature differential between a cruise altitude and ground (for example, sea level) transitions the environmental aspect control assembly between expanded and compressed states. Embodiments of the present disclosure provide a moisture management device in the form of an environmental aspect control assembly that is lighter and less costly than various known moisture management devices that are used in aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An environmental aspect control assembly configured to control one or more environmental aspects, the environmental aspect control assembly comprising:
   at least one aspect-controlling portion formed of one or more environmental aspect-controlling materials; and
   at least one shape-changing actuator operatively connected to the at least one aspect-controlling portion, wherein the at least one shape-changing actuator is not electrically connected, wherein the at least one shape-changing actuator is configured to have a first actuator shape at a first temperature and a second actuator shape at a second temperature that differs from the first temperature, wherein the first actuator shape causes the at least one aspect-controlling portion to form a first structural shape, and wherein the second actuator shape causes the at least one aspect-controlling portion to form a second structural shape that differs from the first structural shape.

2. The environmental aspect control assembly of claim 1, wherein the first structural shape is one of an expanded or compressed structural shape, and wherein the second structural shape is the other of the expanded or compressed structural shape.

3. The environmental aspect control assembly of claim 1, wherein the one or more environmental aspects comprises one or more of moisture, sound, or temperature.

4. The environmental aspect control assembly of claim 1, wherein the one or more environmental aspect-controlling materials includes aramid felt that is configured to absorb moisture.

5. The environmental aspect control assembly of claim 1, wherein the one or more environmental aspect-controlling materials includes open-cell foam that is configured to absorb sound.

6. The environmental aspect control assembly of claim 1, wherein the one or more environmental aspect-controlling materials includes fiberglass insulation.

7. The environmental aspect control assembly of claim 1, wherein the at least one shape-changing actuator comprises one or more of a wire, frame, filament, beam, cage, panel, strip, coil, or sheet that is formed of a shape memory alloy.

8. The environmental aspect control assembly of claim 7, wherein the shape memory alloy is a two-way shape memory alloy.

9. The environmental aspect control assembly of claim 1, wherein the at least one aspect-controlling portion comprises:
   a first layer configured to control moisture;
   a second layer configured to control sound; and
   a third layer configured to control temperature.

10. The environmental aspect control assembly of claim 1, wherein the at least one shape-changing actuator is secured around at least a portion of the at least one aspect-controlling portion.

11. The environmental aspect control assembly of claim 1, wherein the at least one shape-changing actuator is embedded within the at least one aspect-controlling portion.

12. The environmental aspect control assembly of claim 1, wherein the at least one shape-changing actuator comprises a plurality of shape-changing filaments, wherein the at least one aspect-controlling portion comprises a plurality of aspect-controlling fibers, and wherein each of the shape-changing filaments is connected to at least one of the plurality of aspect-controlling fibers.

13. A system comprising:
a main system structure that includes one or more environmental aspect control assemblies, wherein each of the environmental aspect control assemblies comprises (a) at least one aspect-controlling portion formed of one or more environmental aspect-controlling materials; and (b) at least one shape-changing actuator operatively connected to the at least one aspect-controlling portion, wherein the at least one shape-changing actuator is not electrically connected, wherein the at least one shape-changing actuator is configured to have a first actuator shape at a first temperature and a second actuator shape at a second temperature that differs from the first temperature, wherein the first actuator shape causes the at least one aspect-controlling portion to form a first structural shape, and wherein the second actuator shape causes the at least one aspect-controlling portion to form a second structural shape that differs from the first structural shape.

14. The system of claim 13, wherein the system comprises an aircraft, and wherein the main system structure comprises a fuselage having an internal cabin.

15. The system of claim 13, wherein the system comprises an article of clothing having an insulating layer between inner and outer layers, wherein the one or more environmental aspect control assemblies are disposed within the insulating layer.

16. The system of claim 13, wherein the one or more environmental aspect control assemblies automatically adapt to an environment based on changes in temperature.

17. The system of claim 13, wherein the first structural shape is one of an expanded or compressed structural shape, wherein the second structural shape is the other of the expanded or compressed structural shape, wherein the one or more environmental aspects comprises one or more of moisture, sound, or temperature.

18. The system of claim 13, wherein the at least one shape-changing actuator comprises one or more of a wire, frame, filament, beam, cage, panel, strip, coil, or sheet that is formed of a two-way shape memory alloy.

19. An environmental aspect control assembly configured to control one or more environmental aspects, wherein the one or more environmental aspects comprises one or more of moisture, sound, or temperature, the environmental aspect control assembly comprising:
at least one aspect-controlling portion formed of one or more environmental aspect-controlling materials; and
at least one shape-changing actuator formed of a shape memory alloy operatively connected to the at least one aspect-controlling portion, wherein the at least one shape-changing actuator is not electrically connected, wherein the at least one shape-changing actuator is configured to have a first actuator shape at a first temperature and a second actuator shape at a second temperature that differs from the first temperature, wherein the first actuator shape causes the at least one aspect-controlling structure to form a first structural shape, wherein the second actuator shape causes the at least one aspect-controlling structure to form a second structural shape that differs from the first structural shape, wherein the first structural shape is one of an expanded or compressed structural shape, and wherein the second structural shape is the other of the expanded or compressed structural shape.

20. The environmental aspect control assembly of claim 19, wherein the one or more environmental aspect-controlling materials includes one or more of:
aramid felt that is configured to absorb moisture;
open-cell foam that is configured to absorb sound; or
fiberglass insulation.

* * * * *